United States Patent [19]

Harmon

[11] 4,067,369
[45] Jan. 10, 1978

[54] WHOLE TREE EXTRACTION DEVICE

[75] Inventor: Grady R. Harmon, LaFayette, Ala.

[73] Assignee: Weyerhaeuser Company, Tacoma, Wash.

[21] Appl. No.: 646,465

[22] Filed: Jan. 5, 1976

[51] Int. Cl.² .............................................. A01G 23/06
[52] U.S. Cl. ................................ 144/34 R; 37/2 R;
144/2 N; 173/49; 214/3; 254/132
[58] Field of Search ..................... 214/3; 37/2 R, 195;
144/2 N, 34 R, 34 E; 173/49; 254/132, 124

[56] References Cited

U.S. PATENT DOCUMENTS

| | | | |
|---|---|---|---|
| 3,336,082 | 8/1967 | Bodine, Jr. | 37/2 R |
| 3,738,401 | 6/1973 | Wiklund | 144/34 R |
| 3,914,883 | 10/1975 | Bodine | 37/2 R |
| 3,933,188 | 1/1976 | Boivin | 144/3 R |
| 3,936,960 | 2/1976 | Clegg | 37/2 R |
| 3,958,613 | 5/1976 | Herz | 144/2 N |

*Primary Examiner* — Othell M. Simpson
*Assistant Examiner* — W. D. Bray

[57] ABSTRACT

A whole tree extraction device is mounted on a prime mover. The extraction device is comprised of a load frame which is carried and supported by the prime mover. Slidably mounted on one side of the load frame is the power frame to which is attached at least one power cylinder for moving the power frame with respect to the load frame. Mounted on the power frame forwardly thereof is a vibrator frame to which is attached a pair of cooperating shearing blades together with a pair of cooperating gripping extractor arms. A pair of upper gripper arms are mounted on the load frame and open and close in response to a command signal independently of the shearing blades and gripping extractor arms. Means to vibrate the shearing blades and the gripping extractor arms relative to the power frame in a substantially vertical plane during the shearing and extracting modes are operable on a command signal. The vibration imparted to the shearing blades enhances shearing of the lateral roots while the vibration imparted to the gripping extractor arms both enhances lifting and aids in soil removal from the root system.

13 Claims, 7 Drawing Figures

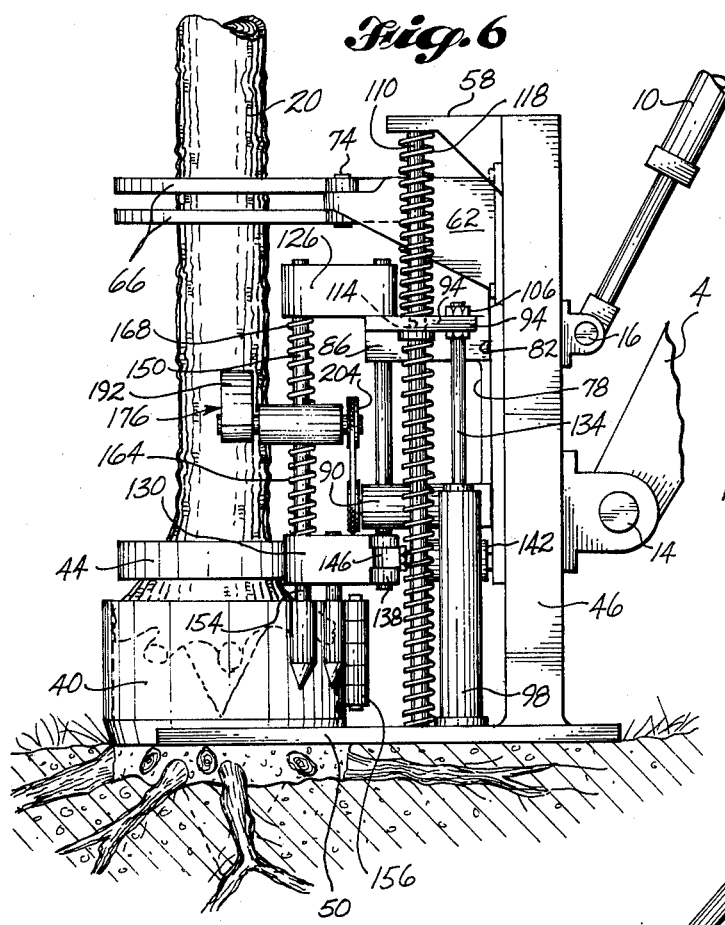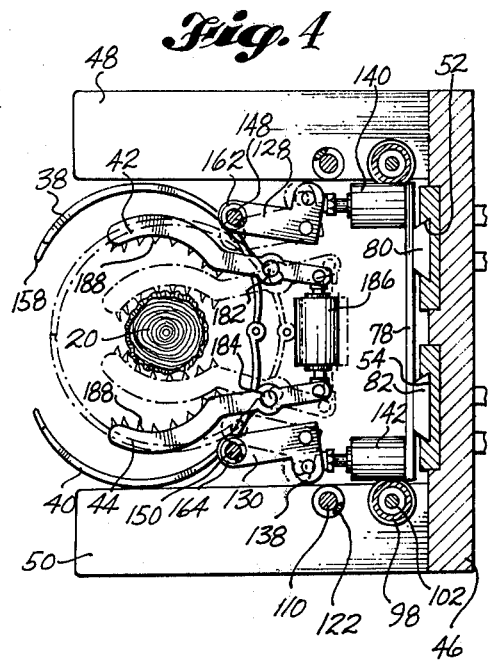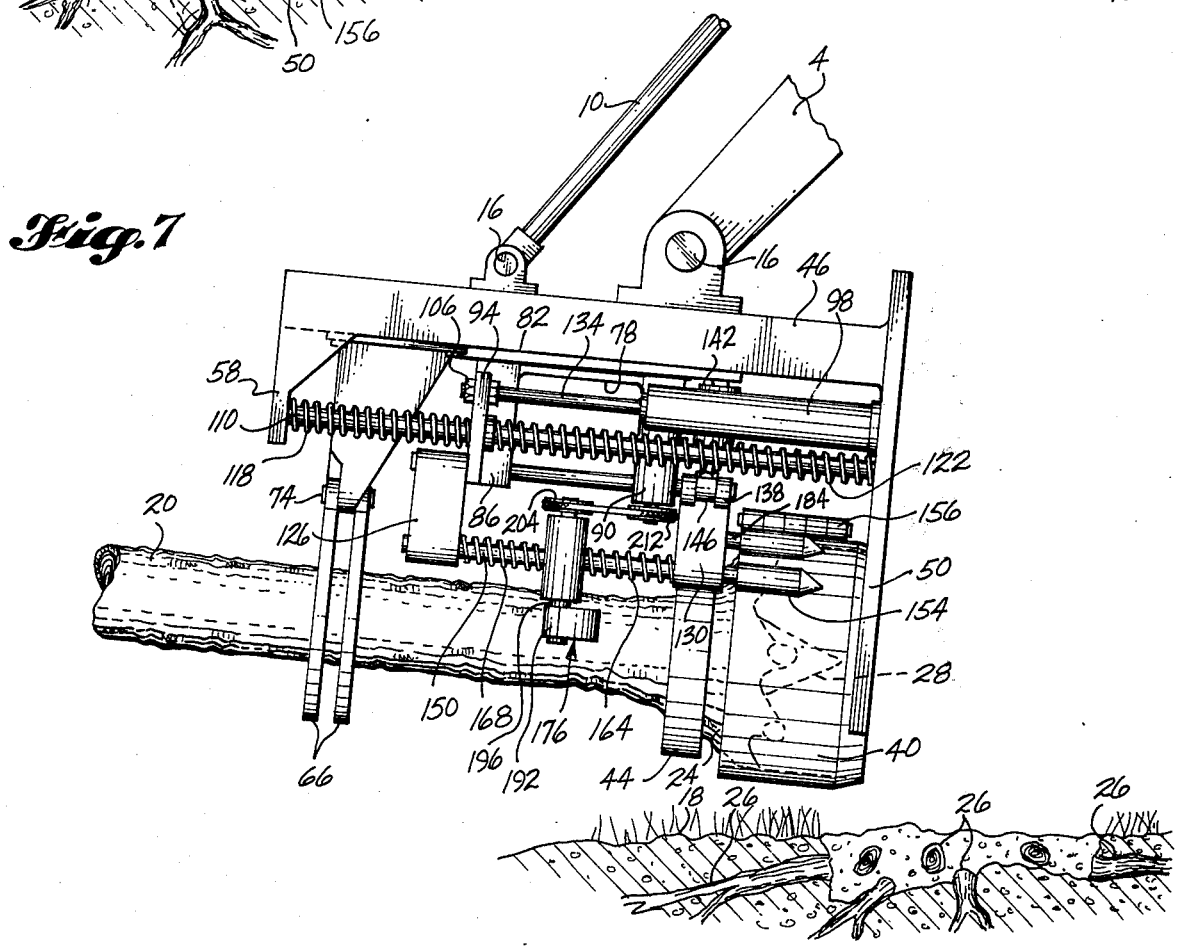

WHOLE TREE EXTRACTION DEVICE

BACKGROUND OF THE INVENTION

This invention relates generally to a machine for extracting substantially the whole tree from its position in the ground. More particularly, it relates to a device for shearing certain of the roots, grasping the stem and then extracting the stem/root combination while applying selected vibratory forces to the tree mass.

In the past, it has not been necessary to consider the desirability and/or economic factors in extracting wood fiber contained in the portion of a tree commonly referred to as the stump/root portion mainly because there was sufficient wood fiber available from the above-ground harvested stems. The traditional method of harvesting trees is to sever the stem at a point somewhere close to ground level and then leave the stump and root system in the ground. In view of the projected wood fiber demand over time, it has now become necessary to consider that wood fiber below ground level.

As is well understood by those familiar with commercially growing forests, a substantial portion of wood fiber is contained in the stump/root portion of the overall tree, and if an efficient economical way of extracting that wood fiber were available, then, additional wood fiber could be made available to satisfy projected demands. The normal use for the below-ground wood fiber, as one skilled in the art would expect, is for use in the pulping process to make paper products. Generally, the wood fiber in the stump/root portion is not suitable for making lumber products, or the like.

Of course, it will be recognized by those skilled in the art, that different tree species have different subsurface characteristics. For example, most of the southern Pine species growing in the mid-South and Southeastern states have a plurality of laterally extending roots, together with a downwardly extending tap root, commonly referred to as a "carrot root." It is the tap root that contains a substantial amount of wood fiber that could be utilized in the pulping process to make useful end products.

As will be appreciated, there are many parameters to consider in designing a suitable apparatus to remove the subsurface wood fiber. For example, shearing forces to cross-cut through lateral roots must be considered as well as depth of shearing action, extraction forces to remove the whole tree and severed root system, dirt contained on the root system, and the hole left by removing the root system. Other considerations are productivity, cost, ease of maintenance, and flexibility.

Of course, others have recognized the value of extracting the wood fiber contained in the tree at subsurface levels. Certain earlier approaches extracted the stump and root system left after cutting, while several newer approaches extract the tree together with a certain portion of the root system. One example of such a whole tree extraction device is that currently being offered by Rome Industries of Cedar Town, Ga. This particular device is generally described in a publication entitled "Canadian Pulp and Paper Industry," June, 1975. The particular design disclosed in the aforementioned publication does have the ability to extract whole trees from the ground, but does not offer the cleaning function integral with the extraction unit. Another example of a whole tree extraction device may be seen by referring to U.S. Pat. No. 3,914,883 which was issued to A. G. Bodine. The Bodine device does have provision for applying vibratory movements to an extractor unit but not in the same manner nor with the same structure as does the present device.

Accordingly, from the foregoing, one object of the present invention is to provide a whole tree extraction device having the capability of cleaning the root system.

Another object is to provide a whole tree extraction device wherein vibration is applied in order to enhance the shearing, cleaning, and extraction process.

Another object is to provide a design utilizing vibratory forces that will extract and clean relatively large trees.

These, and other objects will become apparent upon reading the following specification in conjunction with the attached drawing.

SUMMARY OF THE INVENTION

Briefly stated, this invention is practiced in one form by a whole tree extraction device mounted on a prime mover. The extraction device is comprised of a load frame which is carried and supported by the prime mover. Slidably mounted on one side of the load frame is the power frame to which is attached at least one power cylinder for moving the power frame with respect to the load frame. Mounted on the power frame fowardly thereof is a vibrator frame to which is attached a pair of cooperating shearing blades together with a pair of cooperating gripping extractor arms. A pair of upper gripper arms are mounted on the load frame and open and close in response to a command signal independently of the shearing blades and gripping extractor arms. Means to vibrate the shearing blades and the gripping extractor arms relative to the power frame in a substantially vertical plane during the shearing and extracting modes are operable on a command signal.

BRIEF DESCRIPTION OF THE DRAWING

FIG. 4 is a cross sectional view taken along line 4—4 of FIG. 3 and shows several positions of the shearing blades and gripping extractor arms.

FIG. 6 is also a side elevation view showing the device as it is lifting the whole tree from the ground.

FIG. 7 is a similar side elevation view showing the device after it has turned the whole tree parallel to the ground for further processing.

DESCRIPTION OF THE PREFERRED EMBODIMENT

Figure 1:
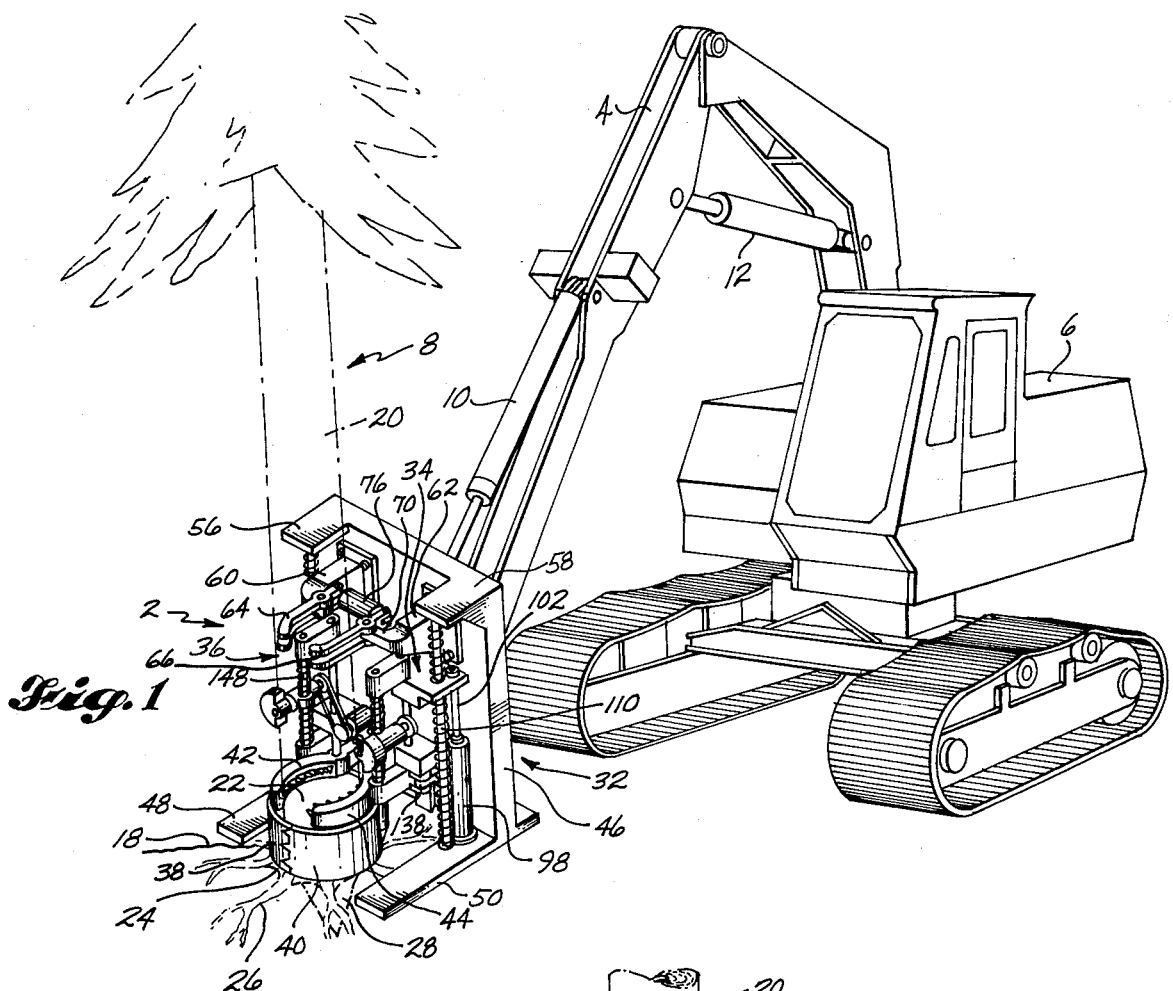
FIG. 1 is a perspective view showing the invention as it would be in place around a tree stem.

Referring to the figures, and in particular to FIG. 1, it may be seen that the extraction device, or head, generally indicated at 2, is attached to the end of an articulated boom 4, which is part of a tractor unit 6. Of course, it will be recognized by those skilled in the art that tractor unit 6 and boom 4 are well known, commercially available machines such as the Drott 40, and act as prime movers for other harvesting devices such as shearing and gripping devices, commonly known as feller-bunchers. It is, of course, the tractor unit 6 that carries the extraction device 2, moving it about the standing trees, one of which is indicated at 8, for harvesting purposes. It is a hydraulic power system within the tractor unit 6 that provides the forces necessary to operate extraction device 2 as well as to offer it movement in three planes.

Figure 5:
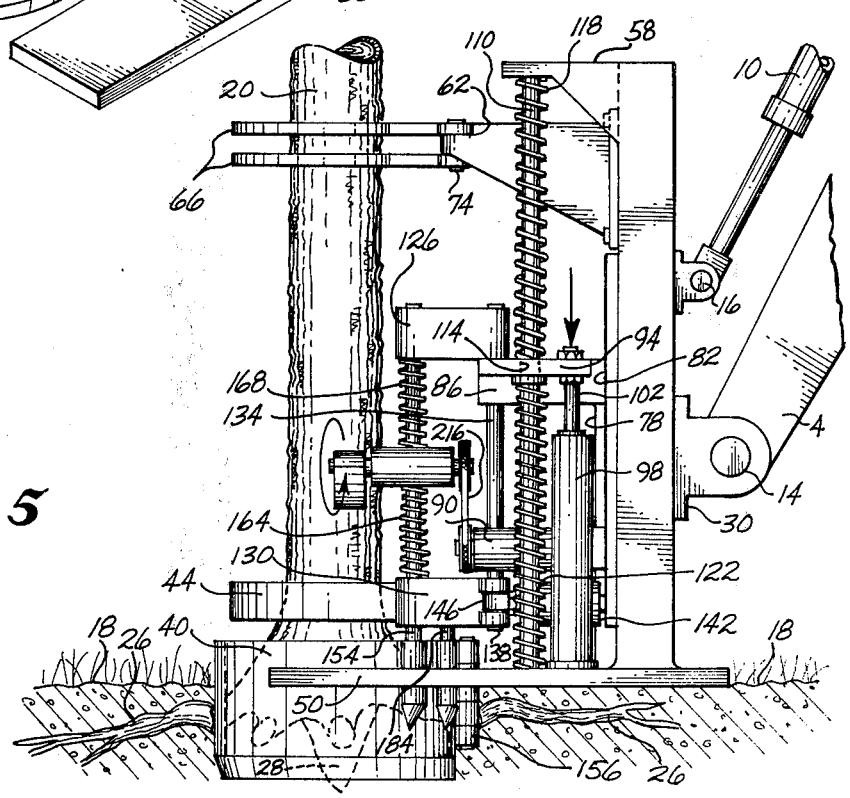
FIG. 5 is a side elevation view showing the device as the vertical shear is being driven into the ground.

On boom 4 are actuating cylinders 10 and 12. Actuating cylinder 10 is adapted to tilt the extraction device 2 about a pinned pivotal support point 14 (best seen in FIGS. 4 – 6), while actuating cylinder 12 functions to lift the entire extraction device 2 upwardly or to lower it downwardly, as the situation requires. Of course, the actuating cylinder 10 is also connected to the extraction device 2 at a pinned pivot point 16 that is positioned vertically above connection point 14. The boom and tractor unit, therefore, have the ability to position the extraction device 2 at ground level 18, directly adjacent a standing tree 8.

For purposes of understanding the full operation of extraction device 2 and the portion of the tree which is intended to be harvested, the several parts of a typical tree will be pointed out. The stem portion is generally indicated at 20, and the portion directly below the bottom most portion of the stem is stump portion 22. Stump portion 22 is that portion commonly left standing from the point where a stem is cut. At ground level 18 the subsurface portion of the tree begins to extend laterally outward while continuing downward, and this portion is typically referred to as the collar 24. Extending laterally outward from collar 24 are the lateral roots 26, while a tap root 28 extends generally downward from the bottom of collar 24. It should be appreciated that a substantial amount of wood fiber is contained in collar 24 and tap root 28; and it is the intent of the present invention to shear lateral roots 26 and then to extract the whole tree, including stem 20, stump 22, collar 24, and tap root 28, leaving the laterals in the ground.

The extraction device 2, as previously noted, is attached to boom 4 at main pinned connection point 14. The mounting means 30 for connection point 14, is firmly fixed to one side of a load frame, generally indicated at 32. Slidably mounted on the other side of load frame 32 is the power frame generally indicated at 34. Mounted on power frame 34 forwardly thereof is the vibrator frame 36, to which is ultimately attached the vertically moveable and vibratory shearing blades 38, 40, and the vibratory gripping extractor arms 42, 44 that move vertically with shearing blades 38, 40. Each of the just mentioned elements will be described in greater detail later, however, for an overall general description the general arrangement of elements has been broadly described.

Looking in more detail now at the extraction device 2 and the other figures, the load frame 32 is comprised of a generally vertically extending solid backwall 46, to which is attached the mounting means 30. Vertical backwall 46 is generally rectangular in shape and has a pair of laterally spaced base arms 48, 50, extending outwardly in the forward direction from the bottom of backwall 46. Of course, it will be recognized that the bottom surfaces of base arms 48, 50 are the ground contact areas for extraction device 2 when it is positioned adjacent a tree to be harvested. The lateral spacing between base arms 48, 50 is sufficient to provide space for additional structure to be described as well as the maximum diameter of any tree to be harvested (maximum diameter being approximately 16" dBH). As would be expected, the base arms also provide support for the overall structure when in the vertical upstanding orientation and as a base for the exertion of certain operational forces.

Mounted on the forward side of backwall 46 are a pair of generally vertically extending laterally spaced keyways 52, 54, in which the power frame 34 is slidably mounted. Extending outwardly from, and forwardly of the upper edge of backwall 46 are the upper laterally spaced horizontally extending arms 56, 58. Horizontal arms 56, 58 are generally directly above the base arms 48, 50, although they do not extend outwardly as far in the forward direction.

Toward the upper horizontal edge of backwall 46, are mounted a pair of forwardly extending mounting arms 60, 62, for supporting a pair of upper gripper arms 64, 66 in their proper spatial relationship with respect to both a tree to be harvested and the shearing blades 38, 40. The mounting arms 60, 62, have inwardly directly horizontal portions 68, 70; on the innermost ends of which are mounted, at pinned connection points 72, 74, the gripper arms 64, 66. The gripper arms 64, 66 are of a typical design for gripping a standing tree. The gripper arms 64, 66 are connected at their rear-most ends to cooperate in an operating mode by a free-floating acutating cylinder 76. The actuating cylinder 76, of course, acts to open and close the gripper arms depending on a command issued by an operator sitting within tractor unit 6. The vertical center line of the gripper arms 64, 66, about which they open and close, will generally coincide with the center line of the tree to be harvested. It is, of course, for this reason that the gripper arms 64, 66 extend forwardly from the horizontal arm portions 68, 70.

Turning now to a more detailed description of the power frame; a generally rectangular, vertically extending wall member 78 has a pair of vertically extending key members 80, 82, on its rear side for mounting within the key ways 52, 54. Thus, wall member 78 is adapted to slide up and down with respect to backwall 46. Extending outwardly and forwardly from the top of wall member 78, and laterally spaced from each other, are upper power arms 84, 86. At the bottom of wall member 78 and extending outwardly therefrom, similar to arms 84, 86, are bottom power arms 88, 90. Extending outwardly from each of the upper power arms 84, 86 in the lateral direction are the power attachment flanges 92, 94. Within each power flange 92, 94, is a suitably sized aperture for the mounting therein of the means to drive power frame 34. Extending upwardly from each base arm 48, 50 at a position substantially adjacent the backwall 46, are the power actuating cylinders 96, 98. Each power cylinder 96, 98 extends vertically upward from its respective base arm with the respective ram 100, 102 at each end being fixed to the power attachment flanges 92, 94. Suitable attaching means 104, 106 fix the end of each ram to its attachment flange. Of course, it should be appreciated that whenever the power cylinder rams 100, 102 are actuated to move either up or down, they will do so in unison in order to move the power frame 34 up or down.

Extending from the base arms 48, 50 to the upper arms 56, 58, and through power attachment flanges 92, 94 are a pair of vertically extending guide shafts 108, 110. Apertures 112, 114 within the attachment flanges 92, 94 accomodate shafts 108, 110 during movement of the power frame. Severing to dampen out vibrations transmitted from various sources to power frame 34 and to prevent their further transmission to load frame 32, are a pair of upper damping springs 116, 118 and a pair of lower damping springs 120, 122. The respective damping springs surround the guide shafts 108, 110.

Turning now to a more complete description of vibrator frame 36 and the shearing blades and gripping extractor arms; it will be seen that the vibrator frame is in two sections with each pivotally connected to power frame 34 by cooperating horizontal upper and lower pivot arms 124, 128 and 126, 130. A pair of vertical rotatable shafts 132, 134 extend through the forward edges of the respective pair of upper and bottom power arms 84, 88 and 86, 90 and support the pivoting arms 124, 128 and 126, 130 in common vertical planes. Serving to turn the respective upper and lower pivot arms together, outwardly or inwardly, are the generally outwardly and laterally extending lever arms 136, 138 mounted at the inner end of each lower pivot arm 128, 130. Each lever arm 136, 138 has the ram end of a respective actuating cylinder 140, 142 attached thereto at pinned connection points 144, 146. The other end of each actuating cylinder 140, 142, is connected to wall member 78 so as to travel therewith on power frame 34.

Whenever cylinders 140, 142 are actuated, the level arms 136, 138 will act to turn the vibrator frame 36 as supported on rotatable shafts 132, 134 either outwardly or inwardly depending upon the desired positioning. Of course, the reason for having a sectioned pivotally mounted vibrator frame is in order to open and close both the shearing blades 38, 40 and the gripping extractor arms 42, 44.

Extending vertically through the forward ends of the respective upper and lower pivot arms 124, 128 and 126, 130 and in a slideable relationship therewith are vibrator shafts 148, 150. Extending downwardly below the lower pivot arms 128, 130 are the lower attachment portions 152, 154 of shafts 148, 150. Fixed to the lower attachment portions 152, 154 at a position that is spaced from the lower edge of the pivot arms 128, 130 are the shearing blades 38, 40. Shearing blades 38, 40 are substantially semi-circular in design and extend for a vertical distance downwardly from the attachment point at attachment portions 152, 154. Shearing blades 38, 40 are adapted to open and close about a vertical hinge 156 which joins the two blades together. The attachment portions 152, 154 are slightly forward of vertical hinge 156 and therefore when the shearing blades open about hinge 156 (see FIG. 4) they will at the same time open outwardly from the vibrator shafts 148, 150 with the vertical hinge 156 moving forward in response to the outwardly directed opening forces. It should be noted that when shearing blades 38, 40 are in their closed position, the split vibrator frame 36 will be in its laterally innermost position, causing the front teeth 158 of the shearing blades to mesh. It should also be noted that a circumferential knife edge 160 is provided along the bottom of shearing blades 38, 40 for cutting purposes.

Serving to support the vibrator shafts 148, 150 and the shearing blades 38, 40 in their proper spatial relationship with respect to power frame 34 are the pair of lower supporting springs 162, 164 and the upper supporting springs 166, 168. Fixed to the vibrator shafts 148, 150 to separate and constrain the respective upper and lower springs are the stops 170, 172. Means generally indicated at 174 and 176 serve to vibrate shafts 148, 150 in planes normal to the upper and lower pivot arms. The vibrator means 174, 176 are in fact fixed to the respective stops 170, 172 and thereby transmit vibro forces to the shafts 148, 150 through stops 170, 172. The lower supporting springs 162, 164 are sized to support the weight of the shafts, shearing blades, and gripping extractor arms when at rest.

The gripping extractor arms 42, 44 are mounted on the upper edge of shearing blades 38, 40 at pivotal connection points 178, 180 by way of upwardly extending bearing shafts 182, 184 at positions rearwardly of vibrator shafts 148, 150 approximately one half the distance between vertical hinge 156 and each vibrator shaft 148, 150. The gripping extractor arms 42, 44 are positioned inwardly from the lower pivot arms 128, 130 and approximately in the same horizontal plane therewith. The innermost ends of extractor arms 42, 44 are operatively connected together by a free floating actuating cylinder 186 which, of course, serves to open and close the extractor arms upon command. It should be appreciated that when the shearing blades, gripping extractor arms, and the upper gripper arms are all in their closed positions a substantially common vertical axis will extend through the center of each unit. Positioned on the inside curvilinear faces of extractor arms 42, 44 are a plurality of generally upwardly extending extractor teeth 188. These are provided in order to enhance the gripping ability of the extractor arms 42, 44.

Turning now to a more complete description of the vibrator means 174, 176, in addition to the stops 170, 172 through which the vibratory movements and forces are transferred to vibrator shafts 148, 150, each means can include, for example, an eccentrically mounted rotatable mass 190, 192 affixed to the forward end of a rotatable shaft 194, 196 which in turn is journaled within a casing 198, 200 firmly attached to stop members 170, 172. At each of the opposite ends of the rotatable shafts 194, 196 is a rotatable sheave 202, 204. Fixed to the power frame 34 at positions on the inside edges of the mounting arms 60, 62 are a pair of spaced motors 206, 208 with rotatable sheaves 210, 212 mounted on their shafts. Rotatable sheaves 210, 212 are substantially in line with the rotatable sheaves 202, 204 for transmitting power therebetween by appropriately designed flexible coupling means 214, 216. The flexible coupling means may be comprised of flexible chain material having suitable strength characteristics.

As may be seen in the figures of the drawing, the rotatable shafts 194, 196 extend in a forward direction and consequently when the eccentrically mounted masses 190, 192 are oppositely rotated, desired vertical forces will be transmitted to the vibrator shafts 148, 150. The eccentric masses have opposed rotation in a vertical plane substantially perpendicular to the center line of boom 4 and this arrangement generates vertical forces in a single vertical plane and effectively prevents the transmission of vibrations to the boom. It will, of course, be apparent that when the vibrating means are actuated they will serve to transmit vibratory forces through vibrator shafts 148, 150 to the shearing blades 38, 40 and gripping extractor arms 42, 44.

In order to enable one skilled in the art to fully understand the structure, certain values have been determined and will be given here by way of example but with no intention of limiting the scope of the invention. For example, when the maximum dBH and weight of a tree to be harvested are 16 inches and 3,000 pounds respectively, it has been found that a vibrofrequency range from 700–1,500 cpm, a vibro-amplitude range of from $\frac{1}{4}$–$\frac{3}{4}$ inch, a vibro-drive torque range of from 1,200–2,000 inch pounds, and a vibro-drive RPM range of from 1,000–2,400 RPM will result in a vibro-impact force of up to 70,000 pounds to force shearing blades 38, 40 into the ground and through the lateral roots. The vertical extraction force would be on the order of 30,000 pounds in order to lift the whole tree from the ground. Assuming an extraction head weight of something on the order of 6,000 pounds, the necessary horse power might be in the range of 80–100 hp.

These cited values will be sufficient to extract whole trees within the weight range cited while the vibro forces will be sufficient to sever roots and soil as well as to shake attached soil from the root structure.

OPERATION OF THE INVENTION

Figure 3:
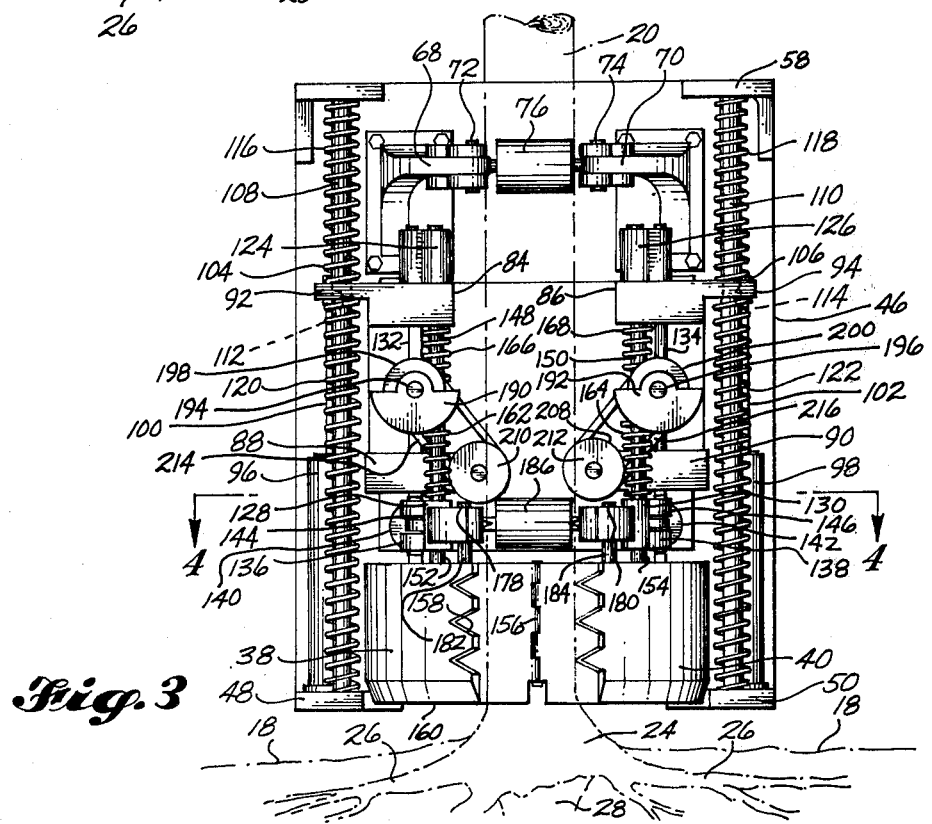
FIG. 3 is a front elevation view showing the device as it is about to close around a tree.
Figure 2:
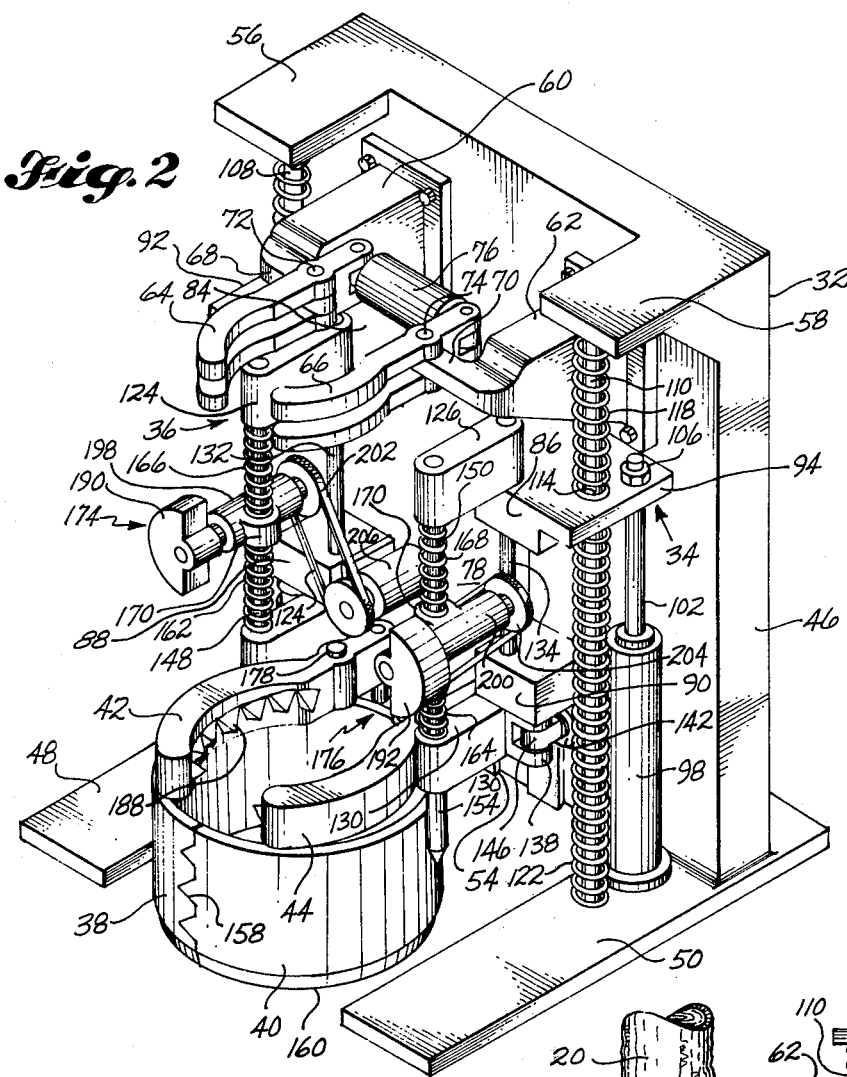
FIG. 2 is a perspective view showing the invention separate and apart from its prime mover.

The operating sequence of the extraction device 2 and tractor unit 6 begins from a position away from a particular tree to be harvested. The operator within tractor unit 6 has the extraction device 2 generally in a vertical orientation with all closure devices open; that is, the shearing blades 38, 40, gripping extractor arms 42, 44, and the upper gripper arms 64, 66 are all open. It is apparent that the respective actuating cylinders for the extractor arms and upper gripper arms are retracted while the actuating cylinders 140, 142 are likewise retracted holding open the shearing blades 38, 40. The power frame 34 and consequently vibrator frame 36 are in their upper positions as controlled by the power actuating cylinders 96, 98. Actuating cylinders 96, 98 are therefore in their extended positions, thereby positioning the knife edge 160 of shearing blades 38, 40 above the horizontal plane extending through the laterally spaced base arms 48, 50. This configuration of the extraction device is best seen by referring to FIG. 3.

The operator then manipulates the boom 4 so as to position the respective arms and shearing blades around the upstanding tree. The load frame 32 and therefore the base arms 48, 50 are brought into solid contact with the ground after encircling the tree. The operator next actuates cylinder 76 causing gripper arms 64, 66 to close about the tree stem. Simultaneously, the actuating cylinders 140, 142 are actuated in order to close shearing blades 38, 40, thereby encircling the stump portion 22 of the upstanding tree. The gripping extractor arms 42, 44 will be left in their open position for the shearing portion of the harvesting cycle.

At this point in the cycle the power frame 34 and vibrator frame 36 are set into motion by power cylinders 96, 98 to drive the shearing blades 38, 40 into the ground and through the lateral roots 26. At the same time, motors 206, 208 are actuated to begin driving the eccentrically mounted masses 190, 192. The vibro-impact forces are transmitted through vibrator shafts 148, 150 to the shearing blades 38, 40 for driving through the soil and servering the lateral roots. The springs mounted on the vibrator shafts as well as those on the guide shafts serve to isolate the vibrations from load frame 32.

When the shearing blades bottom out, that is when the actuating cylinders 96, 98 have retracted fully, both the upper gripper arms 64, 66 and the shearing blades will be opened slightly. The upper gripper arms are opened in order to allow the tree to move upward relative to load frame 32 while the shearing blades are opened in order to relieve the pressure applied to the soil compacted around the roots. At this point the gripper extractor arms 42, 44 are closed by actuating its cylinder 186 in order to hold the tree for extracting. With the shearing blades bottomed out, the extractor arms will contact the tree at ground line, preventing as much damage to the stem 20 as possible.

With the extractor arms thusly closed, the vibrator shafts 148, 150 are set into motion and vertical lifting force is applied through the vibrator frame by the action of cylinders 96, 98 moving the power frame upwardly. Since the vibro-forces are transmitted to the extractor arms, the entire tree and root system that is being extracted will vibrate. The load frame position is maintained until the power actuating cylinders 96, 98 have been completely extended. This additional time will allow most of the soil from the root system to be removed from the root system by the vibrating action and fall back directly into the resulting hole. The boom then swings the whole tree for bunching while at the same time the vibrating action is continued to allow for further cleaning of the root system. In the bunching position the motors 206, 208 are stopped, thereby halting the vibration and the load frame 32 is tilted from vertical to horizontal. The gripping extractor arms 42, 44 are opened and since they move relative to the shearing blades, the extractor teeth 188 will disengage themselves from the tree. After the extractor arms are opened, the shearing blades and the upper gripper arms are simultaneously opened, thereby allowing the whole tree to fall horizontally into the bunch. After allowing the whole tree to fall, the extraction device is repositioned to a vertical orientation and is then ready to repeat the harvesting cycle.

While a detailed description has been given of the principal embodiment, it is understood that many changes and modifications may be made in the above-described whole tree extraction device. All such modifications are intended to be included within the scope of the appended claims.

What is claimed is:

1. A device for harvesting rooted trees where at least the lower portion of a tree together with a substantial portion of the root system is harvested, comprising:
    a load frame,
    a power frame mounted on said load frame arranged and adapted to move relative to said load frame,
    a vibrator frame mounted on said power frame extending forwardly thereof arranged and adapted to be substantially rigidly supported horizontally and flexibly supported vertically with respect to said power frame,
    shearing means mounted on said vibrator frame towards the bottom thereof,
    means to vibrate said shearing means in a plane substantially parallel to said load frame, and
    means mounted on said shearing means to selectively grip the lower portion of a tree holding it with respect to said power frame.

2. The device as in claim 1 in which said power frame is slidably mounted in laterally spaced keyways on said load frame.

3. The device as in claim 1 in which said load frame has a pair of laterally spaced base arms extending outwardly in the forward direction from the bottom of said load frame.

4. The device as in claim 1 further including a pair of gripper arms mounted towards the top of said load frame and extending forwardly thereof, arranged and adapted to open and close about a tree to be harvested.

5. The device as in claim 1 in which said power frame is caused to move relative to said load frame by at least one power actuating cylinder operatively connected between said frames.

6. The device as in claim 1 further including vibration damping means positioned between said power frame and said load frame.

7. The device as in claim 1 in which said vibrator frame is comprised of two laterally spaced sections each of which is pivotally connected to said power frame.

8. The device as in claim 1 in which said arrangement for providing the flexible support for said vibrator frame includes a pair of vibrator shafts which are spring mounted and in a slidable relationship substantially normal to the rigid horizontal support arrangement.

9. The device as in claim 8 in which said shear vibrating means is mounted on said pair of vibrator shafts and includes a pair of eccentrically mounted rotatable masses with one being on each vibrator shaft.

10. The device as in claim 1 in which said shearing means including a pair of hinged shearing blades mounted in substantially parallel orientation with respect to said vibrator frame and extending downwardly therefrom.

11. The device as in claim 10 in which said gripping means are pivotally mounted on the upper edge of said shearing blades toward the rear thereof and include a pair of cooperating curvilinear gripping extractor arms extending substantially normal to said shearing blades.

12. The device as in claim 11 further including a plurality of extractor teeth mounted along the inside faces of said extractor arms.

13. The device as in claim 11 further including an actuating cylinder extending between the most rearward ends of said extractor arms and controllable to open and close said arms.

* * * * *

UNITED STATES PATENT OFFICE
CERTIFICATE OF CORRECTION

PATENT NO. : 4,067,369
DATED : January 10, 1978
INVENTOR(S) : Grady R. Harmon

It is certified that error appears in the above-identified patent and that said Letters Patent are hereby corrected as shown below:

In column 2, line 27, "fowardly" should read --forwardly--;

in column 4, line 66, "Severing" should read --Serving--;

in column 7, line 54, "servering" should read --severing--;

and in claim 10, line 2, "including" should read --includes--.

Signed and Sealed this

Thirteenth Day of June 1978

[SEAL]

Attest:

RUTH C. MASON
Attesting Officer

DONALD W. BANNER
Commissioner of Patents and Trademarks